May 31, 1949.  R. S. DAVIES  2,472,042
PERCENTAGE POWER CONTROL APPARATUS
Filed April 5, 1944
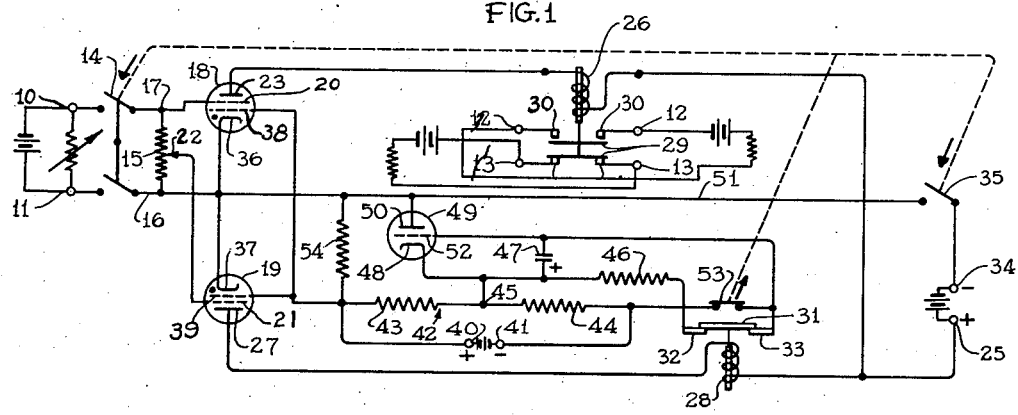
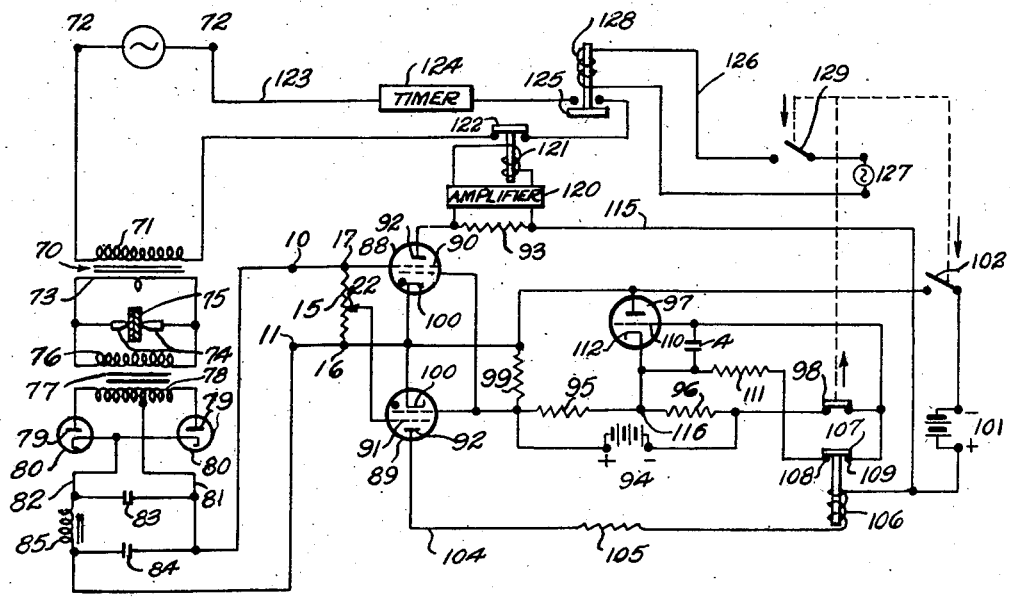
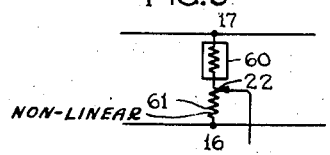
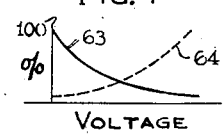
INVENTOR.
RICHARD STILLMAN DAVIES
BY John P. Tarbox
ATTORNEY Patented May 31, 1949

2,472,042

UNITED STATES PATENT OFFICE 2,472,042

PERCENTAGE POWER CONTROL APPARATUS

Richard Stillman Davies, Philadelphia, Pa., assignor to The Budd Company, Philadelphia, Pa., a corporation of Pennsylvania Application April 5, 1944, Serial No. 529,621

22 Claims. (Cl. 219—4)

This invention relates to control apparatus and circuits associated therewith for activating a power circuit after a predetermined percentage change in the voltage as applied to the power circuit.

In various power circuits subject to voltage changes, it is often found desirable that when the voltages change a predetermined percentage of the original or main voltage of the power circuit, mechanism be set in action to open the power circuit. One instance of such a power circuit is that used in resistance welding where voltage is applied at the electrodes of a welding transformer secondary in order to produce a weld by fusion of the metal at the interface of the contacting metals forming the workpiece whereby a solid junction may be obtained between the metal sections. Experimental research has revealed the fact that a large proportion of the resistance of the workpiece in resistance welding is at the surface area between the contacting metal sections of the workpiece and, consequently, as the heating current flows and fusion of the metal results in this area, this resistance decreases as the fusion progresses from a central point outwardly until the entire interface in the cylindrical area defined by the contour of the electrode terminals disappears. This disappearance of interface resistance is, of course, accompanied by a drop in potential which, in metals such as certain steels, may be as high as 25% and, as a rule, averages around 20%. This drop is of sufficient value to be utilized in a control or actuating circuit for opening the main power circuit. Moreover, experiment has revealed that the strength of the weld is directly related to the percentage change of resistance at the weld, so that if the percentage means be set at a selected value corresponding to a certain weld strength value, the indicating or control circuit will not function until this percentage change has occurred. Consequently, if control apparatus, such as hereinabove referred to, is employed in connection with the drop in potential or resistance at the weld point, the primary welding circuit may be opened as soon as the weld is completed or appropriate indication be made of weld completion.

Various means may be employed to accomplish the energization of a power opening device, but in the present invention I utilize what may be referred to as a percentage control apparatus or, more briefly, a percentage apparatus. That is an arrangement of circuit means for establishing a potential fixed with reference to an average main voltage applied to the power unit and usable in conjunction with a change of voltage from the main voltage to the fixed voltage to activate the power unit circuit. Alternatively stated, the invention pertains to a circuit having power means which functions on a change of resistance or on a change of voltage, if the current be constant, at a specified load point.

Accordingly, an object of the present invention is to provide means for de-energizing a circuit on the occurrence of a predetermined change in the voltage of a primary circuit. Another object of this invention is to provide such a circuit arrangement which is operable when the change in the voltage is a fixed percentage of the same, irrespective of the original value of the voltage. Still another object of the invention is to provide a circuit of the type mentioned which may be adapted for actuation upon a non-rectilinear percentage change of the power unit voltage or a component thereof. Further objects pertaining to circuit arrangements are the utilization of a limited number of elements, which may be adapted for operation with relatively limited time lag and which are operable within limits at different initial voltages as applied to the inlet terminals of the circuit.

In the accompanying drawings:

Figure 1 illustrates the basic circuit of the comparator as applicable to any type electrical power circuit;

Figure 2 is a circuit diagram illustrating the application of the basic circuit of Figure 1 to a resistance welding system;

Figure 3 is a detail of a modified form of percentage control, and

Figure 4 is a set of curves illustrating the percentage changes of circuit when incorporating the device of Figure 3.

Referring to Figure 1, the numerals 10 and 11 indicate input terminals from a power source, and the numerals 12 and 13 refer to terminals in load circuits controlled by the actuating apparatus and circuits of the invention.

From the terminals 10 and 11, the main switch 14 passes current to a resistor 15 which lies across the maximum potential points of the terminals. The voltage as applied to the terminals 10 and 11 is direct and, consequently, the resistor has a positive terminal 16 and a negative terminal 17. Adjacent the resistor 15 are two gas tetrodes 18 and 19. The screen grid 20 of tube 18 is connected to the negative terminal 17 of the resistor 15, and the screen grid 21 of tube 19 is connected to a slider contact 22 movable on the resistor 15 so as to secure by its movement any desired percentage of voltage drop between the points 16 and 17, applicable to the screen grid 21. It is evident, therefore, that the screen grid 20 of tube 18 is always at a lower potential than that of the screen grid 21 of tube 19. Anode 23 of tube 18 is connected to the positive terminal 25 of a source of plate potential through a relay coil 26. Similarly, anode 27 of tube 19 is connected to the positive terminal 25 of the plate potential source through a relay coil 28. The relay coil 26 is operative to move contact plates 29 into and out of engagement with contacts 30 in the power actuating circuit; relay 28 is operative to actuate contact plate 31 with reference to contacts 32 and 33 in the percentage circuit, the relationship of said contacts being more fully described hereinafter. The negative terminal 34 of the plate potential source is connected through a manual switch 35 to the positive terminal 16 of the resistor 15, as well as to the cathode 36 of tube 18 and cathode 37 of tube 19 so that a circuit is completed from the potential source 25, 34 through each of the tetrodes which is operable on proper conditioning of the controller grids of the tubes to activate the relays 26 and 28 and to close the power circuits including terminals 12 and 13.

Control grid 38 of tube 18 and control grid 39 of tube 19 are connected together and to a separate source of constant potential having terminals 40 and 41, the control grid connection being directly to the positive terminal 40 of this potential source. Connected across this potential source, also, is a potential divider 42 having resistors 43 and 44 connected in series. At an intermediate point 45 between these two resistors 43 and 44, connection is made both through a resistor 46 to relay contact 32 of relay 28 and through capacitor 47 to contact 33 of the same relay. Also, from this point, connection is made to the cathode 48 of a vacuum triode 49. Anode 50 of this tube is connected directly to the conductor 51 connecting the terminal 16 of the reductor 51 connecting the terminal 16 of the resistor 15 and switch 35. The grid 52 of tube 49 is connected directly to the relay contact 33. The grid current of the tube 49 is normally small.

Additional elements of the percentage circuit include the manual switch 53 normally forming a closed conducting path from the negative terminal resistor 44 and the relay contact 33; and the resistor 54 connected between the conductor 51 and the positive terminal of potential divider resistor 43.

In employing the basic circuit of the percentage apparatus as above described, the same is inserted between the source at terminals 10 and 11 and the switch means leading from terminals 12—13 and direct current voltage is applied to the sources 40, 41 and 25, 34. The main operating switch 14 is then closed, the same being ganged with closed switch 53 and open switch 35 to bring about simultaneously an opening of switch 53 and a closure of switch 35. The gang connection between manual switches 14, 35 and 53 is shown by a dashed line, the arrows indicating the simultaneous movement of the switches on closure of main switch 14. A reversed movement would require a reversal of all arrows.

Subsequent to the connection of potential source 40—41 and prior to the closure of the main switch 14, current flows through the potential divider 42 and, also, through the resistor 46 so that a fixed potential difference is applied to the capacitor 47, with the positive side as indicated. As a consequence of this potential difference on the capacitor 47, a substantially negative potential is applied to the grid 52 of the tube 49 so that the current flow through this tube is negligible. However, on the opening of switch 53, with the closure of the main switch 14, capacitor 47 discharges through the normally closed contact plate 41 thereby reducing the bias of grid 52 and increasing the flow of current through tube 49. The result of this action is to increase the potential of the control grids 38 and 39 of tubes 18 and 19, respectively, with reference to the potentials of cathodes 36 and 37 and when a predetermined voltage is reached, which is related to the voltage impressed on the screen grid 21, the tube 19 strikes and the relay 28 is immediately energized to open contacts 32, 33. It is at once apparent that as soon as these contacts are opened, the discharge of the capacitor 47 ceases and, hence, the potential of grid 52 of tube 49 is fixed. It is also apparent that the steps as described in the operation take place over a short interval of time, so that practically as soon as the switch 14 is closed the standard or comparison voltage established in the tetrode 18 has a fixed value.

Further action of the percentage apparatus will depend upon the original voltage as applied to the resistor 15. If the original voltage is maintained without change, there will be no energization of the relay 26 to close the actuating circuit. Should, however, the voltage across the resistor 15 diminish by a percentage determined by the setting of the slider 22 of the resistor 15, at this point the screen grid 20 and control grid 38 of tube 18 are at the striking point at which tube 19 previously was made effective. Consequently, tube 18 begins to transmit current, relay 26 is energized and contacts 30 are actuated.

It is pointed out that the operation of the percentage apparatus as above described is independent of the absolute value of the potential across points 16, 17, and of resistor 15 within certain limits as may be controlled in the design of the tube characteristics and the relays and other apparatus. In actual use, a substantial deviation from an average value of potential between points 16 and 17 may be made, and for any given value of this range the percentage variation is linear, inasmuch as the resistance per unit length of the resistor 15 is presumed to be uniform.

While, as above indicated, it is desirable that the controlling means operate on a predetermined fixed percentage of the original voltage as applied to the resistor 15, under other conditions of use, it may be important that there be a variation in the percentage relationship in accordance with the absolute value of the original voltage. For example, in resistance welding when the voltage applied to the electrode terminals is relatively low, it may be desirable to increase the percentage of main voltage effective on the controlling means while decreasing the percentage as the main voltage increases. Several means may be employed to accomplish this result.

One mode of accomplishing the result is illustrated in Figure 3 wherein for the single resistor 15, is substituted the two series resistors 60 and 61. Resistor 60 is a linear resistor of the usual type, but resistor 61 has non-linear characteristics, consisting of a material such as silicon carbide, commercially known as Thyrite, or an iron filament in a highly heat conductive atmosphere, such as helium, commercially known as Amperite.

By connecting these resistors as shown in Figure 3, an increase in the initial voltage 16—17 will result in a decrease in the value of the resistance in resistor 61, thus progressively decreasing the percentage value of point 22 in relation to increase of voltage 16—17. Curve 63 in Figure 4 illustrates this percentage variation, the curve being plotted with a percentage of total voltage ordinate and a total voltage abscissa.

By reversing the series position of resistors 60 and 61, a reversal of the voltage-percentage curve as shown by dotted lines 64 will result.

Variation of the curve form of Figure 4 may be obtained by moving slider 22 on resistor 60 or 61. Also for certain applications, instead of the resistor 61 a vacuum triode may be used. In this use, the resistor 60 remains connected to point 17 and the tube is connected in series to point 16, with the plate directly connecting this point. The grid is connected to point 17. Obviously, the tube anode should be operated on the flat section of the volt-current curve.

In Figure 2 of the drawing I have shown the basic circuit of Figure 1 adapted for use specifically in relation to a resistance spot welding power unit with certain modifications, which will now be described. The numeral 70 refers to the welding transformer having a primary 71 connected to the power source terminals 72 and secondary 73, the terminals of which are connected to electrodes 74 between which electrodes a workpiece 75 having multiple contiguous plates is adapted for insertion. Connected around the workpiece and associated electrodes is the primary 76 of a transformer 77, the ends of the secondary 78 of which are connected to the anodes 79 of rectifying tubes 80. Substantially constant direct current is taken off this rectifying unit by the conductor 81 connected to the mid-point of secondary 78, and conductor 82 connected to the cathodes of each of the rectifying tubes 80, and this direct current is smoothed by the capacitative filter including the capacitors 83 and 84 and the choke coil 85. A voltage drop is secured between the conductors 81 and 82 through the percentage resistor 15, the numeral 16 indicating the positive end and the numeral 17 the negative end of said resistor, as in Figure 1. Gas tetrodes 88 and 89, as in the arrangement of Figure 1, are employed, the screen grid 90 of tube 88 having connection to resistor point 17 and the screen grid 91 of tube 89 having connection to a slide contact 22 engaging the resistor 15. Movement of the slide 22 secures any desired percentage value for the screen grid 91 at which the striking point of tube 89 may be fixed.

The rest of the circuit of Figure 2 follows that of Figure 1 in main particulars. In the circuit of anode 92 of tube 88, a resistance drop 93 is employed which is intended to be applicable to the grid and cathode of an amplifying thermionic tube from which, with appropriate multiple amplifying and translating means connection is made to a control actuator on which the amplified voltage is made effective to open the welding circuit at the completion of the weld, as will be more fully described hereinafter. The voltage source 94 applicable to the voltage divider resistors 95 and 96 corresponds to that of Figure 1. Also, the capacitor 4, tube 97, normally closed manual switch 98, resistor 99 between the tetrode cathodes 100 and the postive side of voltage source 94 correspond respectively to the voltage divider resistors 43, 44, capacitor 47, manual switch 53, tube 49 and resistor 54 of Figure 1. The voltage source 101 and the manual switch 102 correspond to the voltage source 34—35 and switch 53 of Figure 1, these voltage sources supplying current to the connected tubes 88, 89 and 18, 19, respectively.

In the circuit of the anode 92 of tube 89 designated by the numeral 104 a resistor 105 is inserted of such value as to balance the resistor 93 in the circuit 115 from the anode 92 of tube 88. Circuit 104 includes also the relay coil 106 which is adapted to open, when energized, the normally closed relay switch 107. This switch bridges contacts 108 and 109, the contact 109 having connection to the manual switch 98, the capacitor 4 and the grid 110 of tube 97, and the contact 108 having connection through the resistor 111 to the positive side of the capacitor 4, to the cathode 112 of tube 97, and to the point 116 in the voltage divider between the resistors 95 and 96.

The circuit of Figure 2 differs from the circuit of Figure 1 also by detailing the circuit connections between the voltage element 93 in circuit 115 and the circuit breaking means of the primary of the welding transformer 70. Any conventional type of direct current amplifier as indicated at 120 may be used. This amplified voltage is impressed on a relay coil 121 which when energized is adapted to open a normally closed relay switch 122 in the circuit 123 of the welding primary. This circuit includes also a timer 124 for setting a limiting time period during which energy may be supplied the welding unit and this constitutes an insurance against excessive heating in case the apparatus hereinabove described should fail to function properly. Circuit 123 includes also the initiating relay switch 125 which is normally open but which is adapted to be closed by the energization of the relay coil 126 in circuit with a source of power 127 and an initiating manual switch 129.

In operation, dependence is placed upon the fact that when the weld formed by fusion of metals at the interface of the contiguous elements of the workpiece forms, the voltage drops, thus originating a voltage impulse which may be translated through the percentage apparatus to the means for opening the welding circuit. Prior to the completion of the weld and after the initiation of the original voltage between the electrodes, the current is rectified through the rectifying unit and is appropriately filtered and applied as a potential difference between the points 16 and 17 of the resistor 15.

Prior to closure of the welding circuit capacitor 4 is charged and after closure of the welding circuit by closing of switch 129, with simultaneous closing of switch 102 and opening of switch 98, capacitor 4 discharges through switch 107 and resistor 111, thus raising the potential of the grid 110 of tube 97 to such a point as to cause the tube 89 to strike, as in the first described arrangement. Current thereupon flows in the anode circuit of tube 89 energizing relay coil 106 and opening switch 107 in the circuit of capacitor 4, interrupting the capacitor discharge and consequently fixing the voltage of the control grid of the tetrode 89 and the current flow therethorugh.

On a subsequent reduction of voltage between points 16 and 17 of the percentage resistor 15, tube 88 strikes and the voltage drop developed across resistor 93 is amplified and made effective to energize relay 121 and open the relay switch 122 and thus disrupt the welding circuit. Initiating switch 128 is then opened with simultaneous closure of switch 98 and opening of switch 102. The circuit is thus conditioned for a new welding cycle.

For best results it is pointed out that in each of the disclosed forms the anode potential on the tetrodes should be substantially equal; and that the capacitors 47 and 4 should have low leakage values. It is pointed out further that the term "voltage" in the specification and claims is used with the assumption that the current value is maintained constant.

It is obvious that the inventive features of the described circuits resides in the combination of elements and in the relationship of the various branch circuits. It is obvious also that while the circuit is applied readily to power cut-off on load voltage change, it may actuate any other desired power mechanism, such as indicating means. Also, while the specific description has been related to a main voltage in which an actuating voltage drop occurs, the actuation may be made to depend on a rise in voltage in order to protect sensitive equipment or for other analogous objects. To accomplish this it will be necessary to make small changes in the circuit. For example, in Fig. 1 the direct current voltage applied to terminals 10 and 11 should be reversed, the connections to resistor points 16 and 17 interchanged, and the tetrode screen grids 20 and 21 be connected directly to point 45 of the voltage divider, in order to secure actuation on a percentage rise in main voltage.

It is pointed out that while the conventional terms "control" and "screen" have been used to designate the grids of tubes 18, 19, 88, 89, such terms are not intended to be limiting, the essential characteristic of the tube and its tube grids being that the tube strikes and transmits power only when each grid attains a predetermined striking potential; hence the mode of connection of the tube grids to the circuit, is normally a matter only of choice within the skill of the technician.

Other variations and modifications coming within the scope of the claims may also be made.

What is claimed is:

1. In an electric control system, an electric power unit subject to voltage change from an initial voltage, a control element adapted for connection to said power unit and having a voltage variable with that of said unit, percentage means for establishing, as a standard, a voltage at a fixed percentage of the initial unit voltage, and a conductor connected to said element and power unit adapted to be energized at a change of the initial voltage to said standard voltage, said standard percentage being constant for varying values of initial voltage.

2. In an electric control system, an electrical power unit subject to a voltage change from an initial value, a percentage apparatus for establishing a percentage relationship between the initial voltage as applied to said unit and a subsequent different voltage, said apparatus comprising a resistor connected across a direct current component of the initial voltage of said power unit, a first gas tetrode having a first grid connected to the negative resistor terminal, a second gas tetrode having a first grid connected to said resistor at a point displaced from said negative resistor terminal to determine a fixed percentage of the total resistance of said resistor, a common voltage source for the other grids of said tetrodes, a common voltage source for the anode-cathode circuits of said tetrodes, means for increasing the grid voltage to the striking point of the second tetrode, and means for holding said striking point voltage of the second tetrode without appreciable change until the first grid voltage on the first tetrode changes to the striking point voltage to cause current flow through said first tetrode.

3. A comparator as described in claim 2 in which the means for increasing the second grid voltage of the second tube to the striking point and holding it at said point until the first grid voltage of the first tetrode drops to the striking point voltage, comprises a voltage divider connected across the second grid voltage source of the second tube, a capacitor and resistor connected in parallel between the negative terminal of the second grid voltage source and a point on said divider, a vacuum tube connected between said voltage divider point and the cathodes of said tetrodes, the grid of said vacuum tube having connection to the negative terminal of said second grid potential source, a resistor connecting the positive terminal of the second grid potential source and said tetrode cathodes, and switch means opening the circuit of the resistor in parallel with said capacitor when the second tetrode strikes.

4. In an electric control system, an electrical power unit subject to voltage change from an initial main voltage, a conductor connected to the power unit, and a percentage apparatus connected to said power unit, said percentage apparatus comprising a variable voltage element, means applicable to said element for setting the percentage value of the main voltage at which the conductor is energized, means for fixing the percentage setting means at the predetermined value, and additional means for energizing said conductor at a change of main voltage to said set percentage value.

5. In a circuit subject to voltage change and varying initial voltage values for each application of the load, in combination, a percentage apparatus for selecting a predetermined voltage percentage value of the initial voltage as applied to said circuit, said percentage apparatus including a gas electron tube having a cathode, an anode, a first grid, and a second grid, means responsive to a component of circuit voltage for applying a voltage on the first grid in accordance with the selected percentage of the initial voltage, means for establishing a voltage between the anode and cathode of said tube, automatic means, including an energy source and a device for increasing the flow of energy from said source, effective only after application of the initial voltage to said circuit for raising a second grid voltage until the tube reaches the striking point, automatic means, including means for halting the increase of flow of energy from said energy source, for fixing the second grid voltage at the striking point whereby a reference voltage for control purposes is provided by the continued firing of said tube, and means conjointly responsive to changed circuit voltage and the fixed percentage voltage values fixed on and by said tube for providing a signal impulse.

6. In a circuit subject to voltage change and varying initial voltage values for each application of the load, in combination, a percentage apparatus for selectively establishing a predetermined percentage voltage value of an initial circuit voltage, said percentage apparatus including a gas electron tube having a cathode, an anode, a first grid, and a second grid, means responsive to a component of circuit voltage for applying a voltage on the first grid at a selected percentage of the initial circuit voltage, means for establishing a voltage between the anode and cathode of said tube, automatic means effective only after the application of the initial voltage to said circuit for increasing the second grid voltage to the striking point and for fixing the second grid voltage at the striking point of said tube, said second grid voltage raising and fixing means including a capacitor connected to said grid, means for charging the capacitor, means for discharging said capacitor to thereby cause the striking of said tube, means for preventing further discharge of the capacitor after the striking of said tube, and means conjointly responsive to changed circuit voltage and the fixed percentage voltage values fixed on and by said tube for providing a signal impulse.

7. In an electrical control system, a percentage apparatus for establishing a fixed percentage value of an initial voltage in a main circuit which comprises percentage means for selecting a percentage value of said initial voltage, and means for fixing said percentage value irrespective of changes in said main circuit voltage from the initial value, said fixing means including a capacitor connected to said percentage means, a power source for charging said capacitor to a predetermined voltage for initiating action of said fixing means, and additional means connected to said capacitor for maintenance of the capacitor voltage at the set voltage corresponding to said selected percentage voltage value.

8. In an electrical control system, a power element for inclusion in a power circuit, a control circuit subject to intermittent voltage changes, a conductor, and control means for producing intermittent energization of the conductor in synchronism with said control circuit voltage changes, said control means being operable only at the same percentage value of initial voltage and independently of the absolute initial value of the intermittent control circuit voltages and the resistance of said circuit.

9. In an electrical control system, a variable voltage control load, a control element connected to said load and variable in voltage therewith, a percentage means for selecting a percentage voltage of said element, means for fixing said percentage voltage automatically for any initial control element voltage, and an output device connected to said control element adapted for energization only on a change of voltage of the control load to a value forming a predetermined voltage ratio to the percentage voltage whereby an auxiliary power device is operated.

10. In an electrical control system, a control load subject to voltage change, a percentage means connected to said load for selecting a percentage voltage of said load, a conductor, means for fixing said selected percentage voltage automatically for any initial control load voltage, and means connected to said percentage means actuated only on a change of voltage of the control load to the selected and fixed percentage value for energizing the conductor.

11. In an electrical control system, in combination, a control load subject to voltage change for each application of the load, a percentage means connected to said load for selecting a percentage of said load voltage, means for fixing said percentage voltage automatically and uniformly for any initial control load voltage in a sequence of intermittently applied load voltages, a normally non-conducting first thermionic tube connected to said percentage means, a conductor connected to said first tube, said percentage voltage fixing means comprising a second thermionic tube having a grid control means, a circuit including a source of power for said second tube, a circuit including a third thermionic tube connected to the grid means of the second tube, a capacitor connected to a grid of the third tube, means for charging the capacitor, means for discharging the capacitor and reducing the negative bias on the third tube grid whereby the positive bias on the grid means of the second tube is increased to a required conducting value, means for holding the capacitor at the charge point at which the second tube conducts, means for imparting a first bias to said first tube when the second tube conducts current, and means for altering the bias on said first tube to cause it to function to impart a signal impulse to said conductor when the load voltage becomes equal to the percentage voltage.

12. In an electrical control system, a variable voltage control load, a control element connected to said load and variable in voltage therewith, a percentage means for selecting a percentage voltage of said element, means for fixing said percentage voltage automatically for any initial control element voltage, and control means variable in voltage with said control load voltage for actuating power mechanism on a change of control load voltage to that of the selected percentage voltage.

13. A method of controlling supply of power from a power source to a series of welds in which the electrical resistance prior to weld fusion varies from weld to weld, which comprises experimentally determining for the workpiece the percentage change of resistance between weld electrodes occurring for a weld of the desired weld strength, successively applying the electrodes to the workpiece at the various weld points, supplying power to the electrodes at each successive weld point until the resistance at the weld changes to the predetermined percentage, fixing a current supply value determined as a percentage relative to that which it has at initial resistance at the weld, and utilizing the current change corresponding to said resistance percentage change at each weld to open the power supply thereto.

14. In a control system for interrupting supply of power from a power source to a welding load, a control element connected to said load and variable in voltage therewith, circuit means for fixing automatically a percentage voltage of the initial control element voltage for each intermittent power supply, and control means connected to said element and source for interrupting power supply to the load on equation of the control element and fixed percentage voltages.

15. In a control system for controlling supply of intermittent power to a welding load, a control element connected to said load and variable in voltage therewith, a percentage device for selecting a percentage voltage of said element, means for fixing said percentage voltage automatically for any initial control element voltage, and control means connected to said element and source for interrupting supply of power to the load on equation of the control element and fixed percentage voltages.

16. In a system of power supply control, a power source, a load subject to voltage change adapted to receive power from said source, and control means dependent on load resistance change for actuating a power device, said control means comprising a percentage device connected to said load for establishing a reference voltage at a fixed percentage of the initial load voltage, and power means connected to the percentage device and power device and operative at a selected fixed ratio between the load and reference voltages for actuating said power device.

17. In an electrical control system for resistance welding, a load subject to resistance change during applications of electric power, a voltage divider connected across said load in parallel therewith and subject to load voltage variation, percentage means connected to said divider for fixing a predetermined percentage value of the initial divider voltage as a reference voltage, and means actuated by a change of load voltage to a predetermined ratio to the reference voltage for controlling the supply of current to said load.

18. An electric control system for electric power units subject to voltage change, characterized by use of a voltage device connected across the power unit and variable in voltage therewith, percentage means connected to the voltage device for establishing as a standard, a voltage at a fixed percentage of the initial unit voltage, control means connected to the voltage device and percentage means subject to the voltage variation of said voltage device, and a translating device connected to said control means, said translating device being energized by said control means on voltage change of the voltage device to a predetermined value in relation to the standard voltage of said percentage means.

19. In an electrical control system, a load subject to changes from initial to secondary resistance values during supply of power thereto, energy response mechanism, and control means interposed between said load and energy response mechanism for energizing said mechanism on a change of load resistance from said initial value to a predetermined percentage value only of said initial value, said control means comprising an impedance connected to said load and subject to a voltage variable with said load voltage, a percentage means for selecting and fixing a percentage value of said impedance voltage, a power actuator, and control means for energizing said actuator on change of impedance voltage to said fixed percentage value only.

20. In an electric control system for an electric resistance welder, in combination, an electric power source, a load unit including welding electrodes receiving electric current from said source and having a relatively sudden and pronounced voltage change for each period of current application, a first grid tube, means for selectively fixing a charge through said tube in accordance with pre-change voltage, a second grid tube responsive conjointly to said fixed charge and a charge which is determined by post-change voltage, and means for providing a control impulse for the welding control circuit when the post-change charge bears a predetermined relationship to the pre-change charge.

21. An electric welder control system as set forth in claim 20, further characterized by the fact that means are provided for pre-selecting the percentage relationship at which said control impulse is furnished.

22. An electric welder control system as set forth in claim 20 further characterized by the fact that said first tube is a gas tube which holds the charge at the fixed value.

RICHARD STILLMAN DAVIES.

REFERENCES CITED

The following references are of record in the file of this patent:

UNITED STATES PATENTS

| Number | Name | Date |
| --- | --- | --- |
| 1,933,937 | Schnetzer | Nov. 7, 1933 |
| 1,959,690 | Roth | May 22, 1934 |
| 1,991,414 | Rees | Feb. 19, 1935 |
| 2,098,041 | Hoppe | Nov. 2, 1937 |
| 2,264,067 | Chambers | Nov. 25, 1941 |
| 2,306,593 | Collom | Dec. 29, 1942 |
| 2,370,009 | Clark et al. | Feb. 20, 1945 |